US012794062B2

(12) United States Patent
Han

(10) Patent No.: US 12,794,062 B2
(45) Date of Patent: Nov. 10, 2026

(54) SANDWICH TYPE ENDPLATE

(71) Applicant: HYUNDAI MOBIS CO., LTD., Seoul (KR)

(72) Inventor: Seung Hoon Han, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 662 days.

(21) Appl. No.: 18/203,275

(22) Filed: May 30, 2023

(65) Prior Publication Data

US 2024/0396142 A1 Nov. 28, 2024

(30) Foreign Application Priority Data

May 23, 2023 (KR) ........................ 10-2023-0066075

(51) Int. Cl.
*H01M 50/242* (2021.01)
*H01M 50/289* (2021.01)

(52) U.S. Cl.
CPC ....... *H01M 50/242* (2021.01); *H01M 50/289* (2021.01)

(58) Field of Classification Search
CPC .......................... H01M 50/242; H01M 50/289
See application file for complete search history.

(56) References Cited

U.S. PATENT DOCUMENTS

| | | | | |
|---|---|---|---|---|
| 5,002,841 A * | 3/1991 | Belongia | H01M 50/77 | 429/70 |
| 5,114,807 A * | 5/1992 | Rowlette | H01M 10/18 | 429/152 |
| 5,308,718 A * | 5/1994 | Eidler | H01M 10/02 | 429/70 |
| 8,586,235 B2 * | 11/2013 | Jeon | H01M 50/264 | 429/186 |

(Continued)

FOREIGN PATENT DOCUMENTS

CN 211980691 U * 11/2020
CN 216145722 U * 3/2022

(Continued)

OTHER PUBLICATIONS

Machine Translation of JP-2001167745-A (Dec. 5, 2025) (Year: 2025).*

(Continued)

*Primary Examiner* — Matthew J Merkling
(74) *Attorney, Agent, or Firm* — Morgan, Lewis & Bockius LLP

(57) ABSTRACT

A sandwich type end plate supporting at least one end of a battery module in which a plurality of battery cells are stacked, the sandwich type end plate comprises: a first outer skin layer configured as a plate provided in a direction toward the plurality of battery cells, a second outer skin layer configured as a plate provided in a direction opposite to the plurality of battery cells and a core module including at least one core layer configured as a plate provided (Continued)

between the first outer skin layer and the second outer skin layer, wherein a core layer of the at least one core layer has a larger stiffness toward a direction in which the plurality of battery cells are stacked than the first outer skin layer and the second outer skin layer, and the at least one core layer protrudes toward the second outer skin layer.

17 Claims, 6 Drawing Sheets

(56) References Cited

U.S. PATENT DOCUMENTS

| | | | | |
|---|---|---|---|---|
| 10,541,395 | B2 * | 1/2020 | Bessho | H01M 50/264 |
| 10,840,485 | B2 * | 11/2020 | You | H01M 50/209 |
| 2018/0019455 | A1 * | 1/2018 | Chen | H01M 50/291 |
| 2018/0034024 | A1 * | 2/2018 | Chen | H01M 6/5038 |
| 2018/0212212 | A1 * | 7/2018 | Cao | H01M 50/256 |
| 2020/0106065 | A1 * | 4/2020 | Ito | H01M 50/229 |
| 2021/0376405 | A1 * | 12/2021 | Browning | B32B 15/20 |
| 2023/0327252 | A1 * | 10/2023 | Yasue | H01M 10/653<br>429/465 |

FOREIGN PATENT DOCUMENTS

| | | | | | |
|---|---|---|---|---|---|
| CN | 116053680 | A | * | 5/2023 | H01M 50/236 |
| JP | 2001167745 | A | * | 6/2001 | H01M 8/247 |
| KR | 10-1252949 | B1 | | 4/2013 | |
| WO | WO-2022224468 | A1 | * | 10/2022 | H01M 50/293 |

OTHER PUBLICATIONS

Machine Translation of CN-211980691-U (Dec. 5, 2025) (Year: 2025).*

Machine Translation of CN-216145722-U (Dec. 5, 2025) (Year: 2025).*

Machine Translation of CN-116053680-A (Dec. 5, 2025) (Year: 2025).*

Machine translation of WO-2022224468-A1 (Year: 2026).*

* cited by examiner

SANDWICH TYPE ENDPLATE

CROSS-REFERENCE TO RELATED APPLICATIONS

This application claims priority under 35 U.S.C. § 119 to Korean Patent Application No. 10-2023-0066075, filed on May 23, 2023, in the Korean Intellectual Property Office, the disclosure of which is incorporated herein by reference in its entirety.

TECHNICAL FIELD

The following disclosure relates to an end plate applied to a battery.

BACKGROUND

Currently, most electrically driven mobility devices such as electric vehicles, e-vtol, and AMR use lithium-ion-based battery cells as energy sources. In such a lithium-ion battery cell, an electrolyte vaporizes because the battery cell is repeatedly charged and discharged and due to its use conditions, and changes to a gas within the battery cell, thereby causing internal pressure of cells. This internal pressure of cells, called a swelling force, accumulates and causes a deformation of a battery structure, leading to inappropriate results in terms of safety and performance. In order to prevent a deformation of a battery structure, it is necessary to design a battery to have high structural safety.

In the meantime, as the demand for eco-friendly energy is growing, the need for next-generation batteries is growing day by day. All-solid-state batteries and silicon cathode batteries, which are considered representative next-generation batteries, are known to have about 3 to 10 times larger internal pressure of cells than that of conventional lithium-ion cells. Thus, the demand for structural safety of each battery is increasing. However, in order to satisfy high structural safety, the weight of the battery module has increased, but this is contrary to the weight reduction issue for battery modules, which is a main focus for improvements in performance of electric vehicles and urban air mobility devices, which are currently being actively developed. Therefore, the first priority is to find an optimal point between a rigidity and a weight of a battery module.

In the prior art, as a method selected to minimize deformations of battery cells, surface pressure pads have been stacked between the battery cells. Alternatively, surface pressure structures made of main materials which are aluminum and steel have been applied to end plates coupled to both ends of the battery module. Accordingly, the weight of the battery module has increased as much as the weights of the surface pressure pads and the surface pressure structures, resulting in a problem that it is difficult to reduce the weight of the battery module because the increase in weight of the battery is inevitable.

PRIOR ART DOCUMENT

Patent Document (Patent Document 1) Korean Patent No. 10-1252949 entitled “BATTERY MODULE” issued on Apr. 3, 2013

SUMMARY

An embodiment of the present invention is directed to providing a sandwich type end plate capable of reducing a weight of a battery system as compared to that when a conventional aluminum or steel end plate is applied, which is advantageous in that the specific energy of the battery system can be increased by applying a surface pressure structure having a sandwich structure with a high specific stiffness into the battery system.

Another embodiment of the present invention is directed to providing a sandwich type end plate capable of minimizing a deformation even though the pressure applied to the battery cell support increases by taking a form for increasing a bending stiffness relative to the same weight, such that the sandwich type end plate can be easily applied to a next-generation battery.

Another embodiment of the present invention is directed to providing a sandwich type end plate capable of pressurizing battery cells for a long period of time even if a battery is in a thermal runaway situation by using a material having excellent thermal resistance as a core material.

In one general aspect, a sandwich type end plate supporting at least one end of a battery module in which a plurality of battery cells are stacked includes: a first outer skin layer that is a plate provided in a direction toward the battery cells; a second outer skin layer that is a plate provided in a direction opposite to the battery cells; and a core module including at least one core layer that is a plate provided between the first outer skin layer and the second outer skin layer, wherein the core layer has a larger stiffness toward a direction in which the battery cells are stacked than the first outer skin layer and the second outer skin layer, and at least one of the core layers protrudes toward the second outer skin layer.

The core layer may be made of a porous material including a plurality of core holes and barrier ribs forming boundaries between the core holes.

The second outer skin layer may be bent to protrude outward to form an accommodating portion, and one surface of the core layer contacting the second outer skin layer may protrude toward the second outer skin layer to fill the accommodating portion, and the other surface of the core layer may be formed to be flat.

The accommodating portion may be formed in such a manner that a cross-sectional area decreases as a protruding height increases, and the accommodating portion may be formed to have the largest protruding height at a position corresponding to the center of one surface of each of the battery cells.

The sandwich type end plate may further include a reinforcing block provided at a central portion of the accommodating portion and inserted through the core layer.

The reinforcing block may include one or more through holes formed in the direction in which the battery cells are stacked.

The sandwich type end plate may further include a first functional layer stacked between the first outer skin layer and the battery cells, wherein the first functional layer includes an insulating material.

The core module may include two or more core layers between the first outer skin layer and the second outer skin layer, and the sandwich type end plate may further include a second functional layer inserted and stacked between two of the core layers.

The first outer skin layer and the second outer skin layer may be bent to protrude outward of the respective core layers to form accommodating portions, and the core layers contacting the first outer skin layer and the second outer skin layer may protrude to correspond to the respective accommodating portions.

The second functional layer may include at least one of a heat insulating material, a sound absorbing material, and a cushioning material.

The sandwich type support structure having the above-described configuration according to the present invention is capable of reducing a weight of a battery system as compared to that when a conventional aluminum or steel end plate is applied, which is advantageous in that the specific energy of the battery system can be increased by applying a surface pressure structure having a sandwich structure with a high specific stiffness into the battery system.

In addition, the sandwich type support structure having the above-described configuration according to the present invention is capable of minimizing a deformation even though the pressure applied to the battery cell support increases by taking a form for increasing a bending stiffness relative to the same weight, such that the sandwich type end plate can be easily applied to a next-generation battery.

In addition, the sandwich type support structure having the above-described configuration according to the present invention is capable of pressurizing battery cells for a long period of time even if a battery is in a thermal runaway situation by using a material having excellent thermal resistance as a core material.

DETAILED DESCRIPTION OF MAIN ELEMENTS

Figure 1:
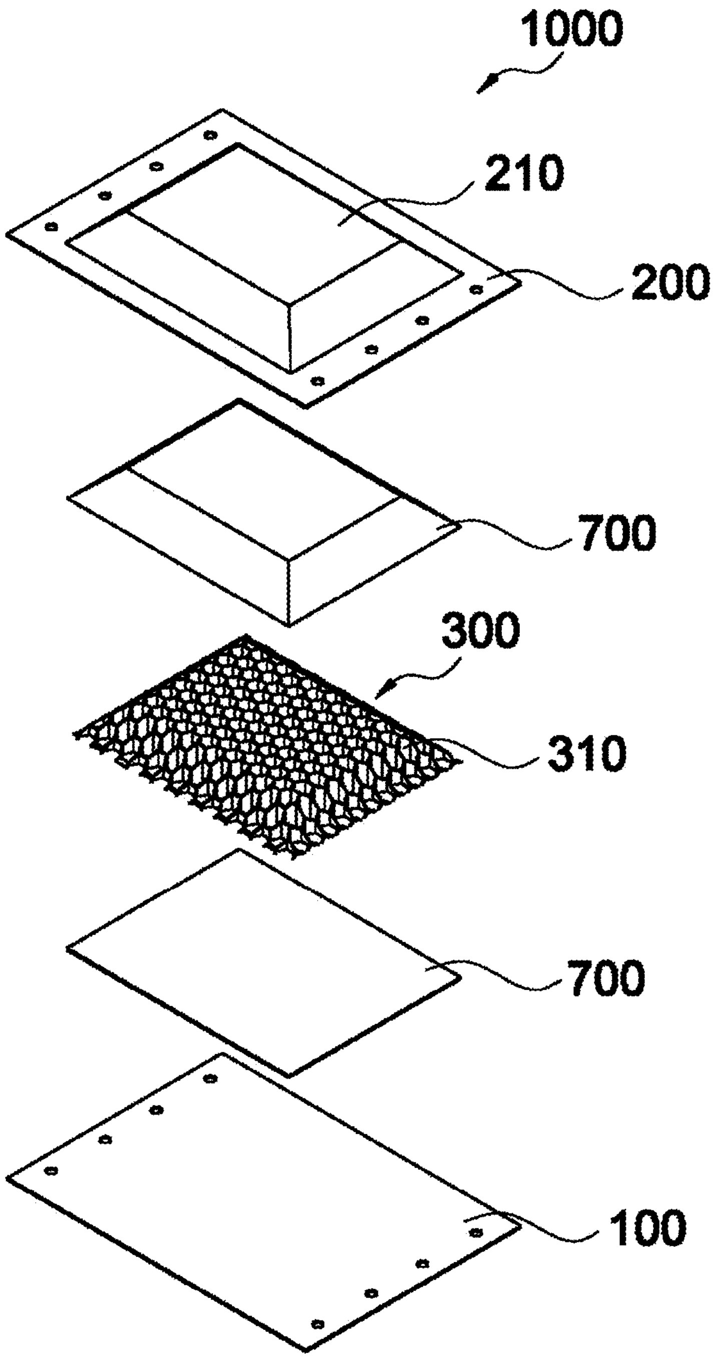
FIG. 1 is an exploded perspective view illustrating a basic form of a sandwich type end plate according to the present invention.

1000: Sandwich type end plate
100: First outer skin layer
200: Second outer skin layer
210: Accommodating portion
300: Core module
310: Core layer
311: Barrier rib
312: Core hole
400: Reinforcing block
410: Through hole
500: First functional layer
600: Second functional layer
700: Adhesive layer

DETAILED DESCRIPTION OF EMBODIMENTS

Hereinafter, the technical idea of the present invention will be described in more detail with reference to the accompanying drawings. Further, terms or words used in the specification and claims herein should not be interpreted as being limited to the ordinary or dictionary meanings, but interpreted as meanings and concepts corresponding to the technical idea of the present invention based on the principle that the inventor can appropriately define concepts of terms to describe his/her invention in the best way.

Hereinafter, a basic configuration of a sandwich type end plate 1000 of the present invention will be described with reference to FIG. 1.

As illustrated in FIG. 1, the sandwich type end plate 1000 according to the present invention, which is provided to support at least one end of a battery module in which a plurality of battery cells are stacked, may include a core module 300 serving as a main supporting body, and a first outer skin layer 100 and a second outer skin layer 200 surrounding and protecting both sides of the core module 300. More specifically, the sandwich type end plate 1000 according to the present invention may include a first outer skin layer 100 that is a plate provided in a direction toward the battery cells. In addition, the sandwich type end plate 1000 according to the present invention may include a second outer skin layer 200 that is a plate provided in a direction opposite to the battery cells. The first outer skin layer 100 and the second outer skin layer 200 may include a composite material such as thermoset carbon fiber reinforced plastic (thermoset CFRP), carbon fiber reinforced thermal plastic (CFRTP), or glass fiber reinforced plastic (GFRP).

In addition, the sandwich type end plate 1000 according to the present invention may include a core module, and the core module 300 may include at least one core layer 310 that is a plate provided between the first outer skin layer 100 and the second outer skin layer 200.

The core layer 310 may have a larger stiffness toward a direction in which the battery cells are stacked than the first outer skin layer 100 and the second outer skin layer 200, aluminum, iron, aramid, glass fiber, carbon, ceramic, balsa, or the like may be applied as a material of the core layer 310. In addition, the core layer 310 may be made of a porous material including a plurality of core holes 312 and barrier ribs 311 forming boundaries between the core holes 312. For example, the core layer may include a honeycomb core, a foam core, a wood core, or the like. The core holes 312 and the barrier ribs 311 of the core layer 310 may be repeated in the same shape. The core hole 312 or the barrier rib 311 may have a hexagonal shape like the honeycomb core, but is not limited thereto, and may have a triangular shape or a wave-like shape.

Accordingly, unlike a panel-type structure, the core layer 310 according to the present invention exhibits a deformation behavior that varies depending on a direction of a force, thereby increasing a second moment of area, which is an index indicating a resistance to bending, with respect to a thickness of the core layer 310 against a bending load in a plane direction, so that the core layer 310 according to the present invention may tend to be stronger than typical plates.

Since the swelling force of the battery module applies a bending load in the plane direction to the sandwich type end plate 1000 according to the present invention, the design of the core layer 310 of the sandwich type end plate 1000 according to the present invention is very effective when applied to the battery module.

In this case, adhesive layers 700 may be further applied between the core module 300 and the first and second outer skin layers 100 and 200. As a result, the first and second outer skin layers 100 and 200 and the core layer 310 of the core module 300, which are made of different kinds of materials, can be bonded to each other to form a single sandwich structure.

Furthermore, at least one of the core layers 310 may protrude toward the second outer skin layer 200, that is, toward a side that is not in contact with the battery module of the sandwich type end plate 1000. Accordingly, the non-protruding portion of the sandwich type end plate 1000 adheres tightly to the battery cell to more closely support the shape of the battery cell, and the protruding portion of the sandwich type end plate 1000 may have a larger stiffness against a bending load in the plane direction. Finally, it is possible to more effectively secure a high resistance to a swelling force.

In order to confirm the bending stiffness improving effect of the sandwich type end plate 1000 according to the present invention, bending stiffnesses of steel and aluminum, which were materials applied to conventional end plates, were compared with that of the composite material applied to the sandwich structure through analysis at the same level of weight as shown in Table 1 below.

TABLE 1

| Name | Volume | Density | Mass | Maximum deformation amount |
|---|---|---|---|---|
| Al 2.05 t (Aluminum 6N01) | 1.447e−004 m3 | 2700 kg_m3 | 0.391 kg | 6.76 mm |
| Steel 0.705 t | 4.976e−005 m3 | 7850 kg_m3 | 0.391 kg | 52.39 mm |
| Sandwich type end plate (basic form) | 7.901e−005 m3<br>4.587e−005 m3<br>7.059e−005 m3 | 1800 kg_m3<br>2700 kg_m3<br>1800 kg_m3 | 0.142 kg<br>0.124 kg<br>0.127 kg = 0.393 kg | 0.23 mm |

In the sandwich type end plate 1000 according to the present invention shown in Table 1, the maximum deformation amount was 0.23 mm, which was significantly smaller than the maximum deformation amounts, i.e., 6.76 mm and 52.39 mm, of aluminum (row 1) and steel (row 2) applied to the conventional end plates. In addition, the mass of the sandwich type end plate 1000 according to the present invention was 0.393 kg as a total mass of the first outer skin layer 100, the second outer skin layer 200, and the core layer 310, which was almost similar to the mass of the conventional material, i.e., aluminum or steel.

It can be confirmed from these experimental results that the sandwich type end plate 1000 according to the present invention has a significantly smaller deformation amount than the conventional end plates at the same mass as the conventional end plates, and the sandwich type end plate 1000 according to the present invention has better performance than the conventional end plates in terms of both weight reduction of the battery module and resistance to the swelling force of the battery cell.

Hereinafter, a sandwich type end plate 1000 according to a first embodiment of the present invention will be described in more detail with reference to FIGS. 2 to 4.

Figure 2:
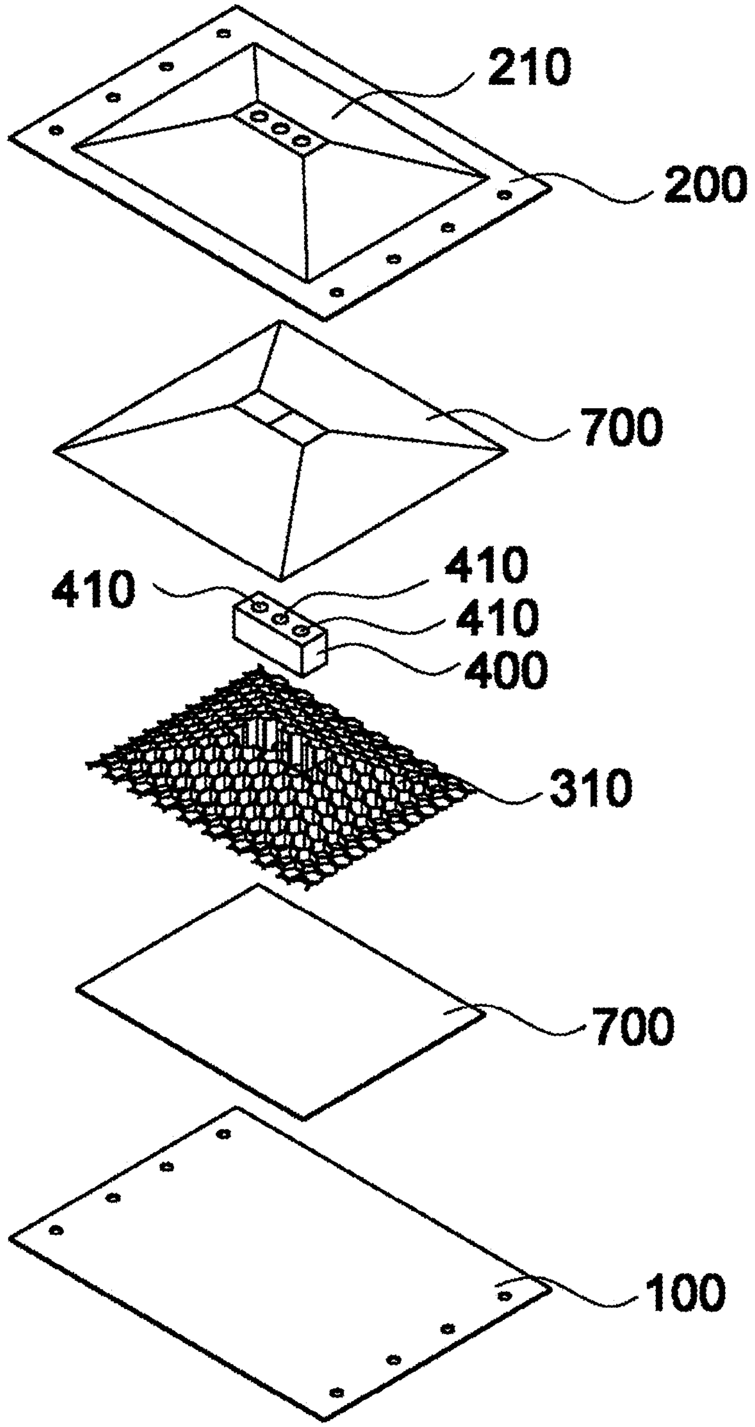
FIG. 2 is an exploded perspective view illustrating a sandwich type end plate according to a first embodiment of the present invention.

In the sandwich type end plate 1000 according to the first embodiment of the present invention as illustrated in FIG. 2, the second outer skin layer 200 may be bent to protrude outward to form an accommodating portion 210, and one surface of the core layer 310 contacting the second outer skin layer 200 may protrude toward the second outer skin layer 200 to fill the accommodating portion 210. In this case, the other surface of the core layer 310 may be formed to be flat. Accordingly, the non-protruding portion of the sandwich type end plate 1000 adheres tightly to the battery cell to more closely support the shape of the battery cell, and the protruding portion of the sandwich type end plate 1000 may have a larger stiffness against a bending load in the plane direction. Finally, it is possible to more effectively secure a high resistance to a swelling force.

Figure 3:
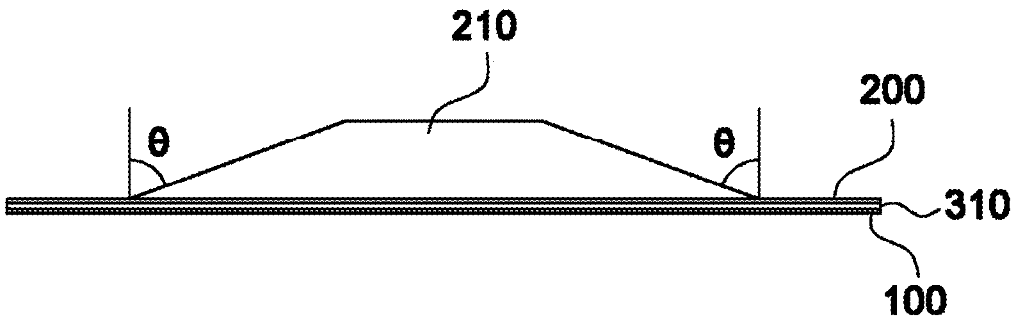
FIG. 3 is a side view illustrating the sandwich type end plate according to the first embodiment of the present invention.

Also, as illustrated in FIG. 3, the accommodating portion 210 may be formed in such a manner that a cross-sectional area decreases as a protruding height increases. That is, the accommodating portion 210 may be formed in a quadrangular pyramid-like shape or in a quadrangular truncated pyramid-like shape. The accommodating portion 210 may have a side surface inclined at an angle θ greater than 20 degrees. In this case, the accommodating portion 210 may be formed to have the largest protruding height at a position corresponding to the center of one surface of the battery cell. Accordingly, the bending stiffness may increase toward the central portion of the battery module, where the swelling force is applied most strongly, thereby causing a high resistance to the swelling force more effectively.

In addition, the sandwich type end plate 1000 according to the first embodiment of the present invention may further include a reinforcing block 400 provided at the central portion of the accommodating portion 210 and inserted through the core layer 310. The reinforcing block 400 may be made of a composite material including aluminum and steel to be resistant to temperature and pressure during the molding process. As a result, it is possible to further reinforce the stiffness in the central portion where the largest deformation occurs when the largest swelling force is applied.

In addition, the reinforcing block 400 may include one or more through holes 410 formed in the direction in which the battery cells are stacked, and the second outer skin layer 200 may also include holes in the same size as the through holes 410 of the reinforcing block 400 at positions corresponding to the through holes 410 of the reinforcing block 400. By forming such a structure enabling the sandwich type end plate 1000 to be fastened to the outside of the battery, it is possible to control a deformation amount even in a situation where a larger load is applied.

In order to confirm the bending stiffness improving effect of the sandwich type end plate 1000 according to the first embodiment of the present invention, bending stiffnesses of steel and aluminum, which were materials applied to conventional end plates, were compared with that of the composite material applied to the sandwich structure through analysis at the same level of weight as shown in Table 2 below.

TABLE 2

| Name | Volume | Density | Mass | Maximum deformation amount |
|---|---|---|---|---|
| Al 2.1 t (Aluminum 6N01) | 1.482e−004 m3 | 2700 kg_m3 | 0.4 kg | 4.2898e+00 mm |
| Steel 0.72 t | 5.082e−005 m3 | 7850 kg_m3 | 0.399 kg | 3.4677e+01 mm |
| Sandwich type | 7.279e−005 m3 | 1800 kg_m3 | 0.131 kg | 3.7408e−04 mm |
| end plate (first | 5.617e−005 m3 | 2700 kg_m3 | 0.152 kg | |
| embodiment) | 7.059e−005 m3 | 1800 kg_m3 | 0.127 kg = 0. 41 kg | |

In the sandwich type end plate 1000 according to the first embodiment of the present invention shown in Table 2, the maximum deformation amount was 3.7408e-04 mm, which was significantly smaller than the maximum deformation amounts, i.e., 4.2898e+00 mm and 3.4677e+01 mm, of aluminum (row 1) and steel (row 2) applied to the conventional end plates, indicating that there was little deformation. In addition, the mass of the sandwich type end plate 1000 according to the first embodiment of the present invention was 0.41 kg as a total mass of the first outer skin layer 100, the second outer skin layer 200, and the core layer 310, which was almost similar to the mass of the conventional material, i.e., aluminum or steel.

It can be confirmed from these experimental results that the sandwich type end plate 1000 according to the first embodiment of the present invention has a significantly smaller deformation amount than the conventional end plates at the same mass as the conventional end plates, and the sandwich type end plate 1000 according to the first embodiment of the present invention has better performance than the conventional end plates in terms of both weight reduction of the battery module and resistance to the swelling force of the battery cell.

Figure 4:
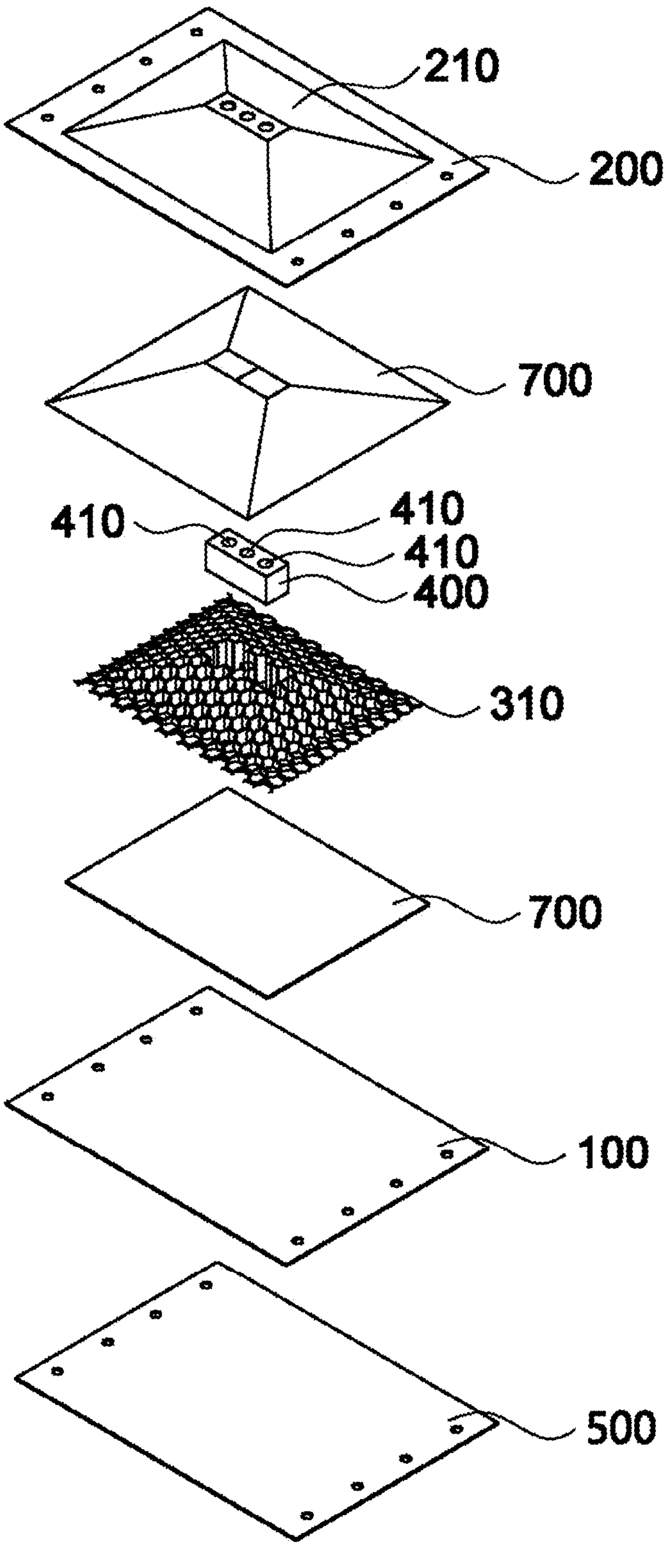
FIG. 4 is an exploded perspective view illustrating a sandwich type end plate according to a specific example of the first embodiment of the present invention.

In addition, in the sandwich type end plate 1000 according to the first embodiment of the present invention as illustrated in FIG. 4, the sandwich type end plate 1000 may further include a first functional layer 500 stacked between the first outer skin layer 100 and the battery cells. The first functional layer 500 may include an insulating material, and the insulating material may include glass fiber reinforced plastic (GFRP). An adhesive layer 700 may be further applied between the first functional layer 500 and the first outer skin layer 100. Alternatively, the first functional layer 500 and the first outer skin layer 100 may be integrally formed as one layer. The first functional layer 500 makes it possible to secure a creeping distance between the first outer skin layer 100, which is made of a conductive material, and the battery cells, and electrically insulate the sandwich type end plate 1000 according to the present invention.

Hereinafter, a sandwich type end plate 1000 according to a second embodiment of the present invention will be described with reference to FIGS. 5 and 6.

Figure 5:
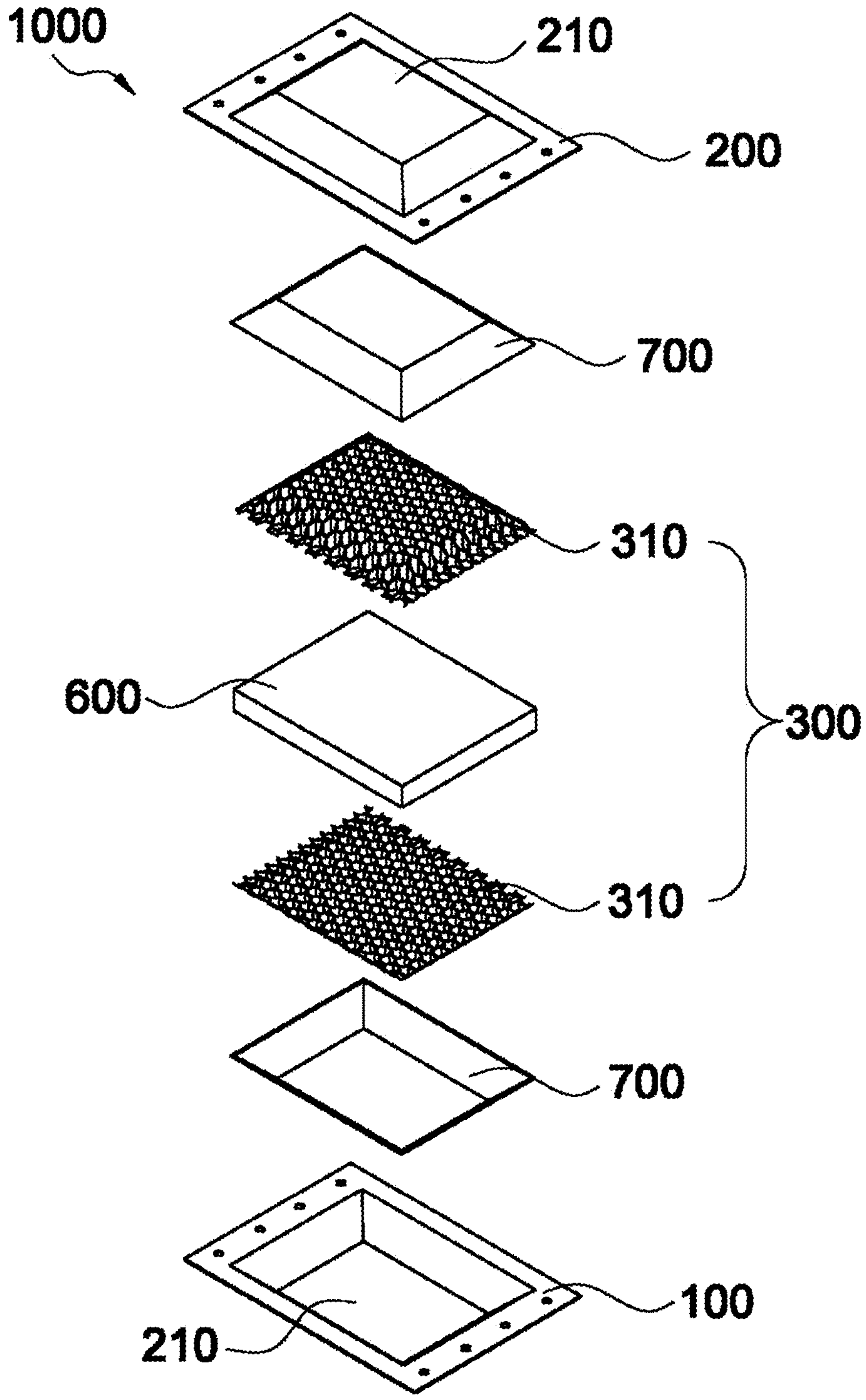
FIG. 5 is an exploded perspective view illustrating a sandwich type end plate according to a second embodiment of the present invention.

In the sandwich type end plate 1000 according to the second embodiment of the present invention as illustrated in FIG. 5, the core module 300 may include two or more core layers 310 between the first outer skin layer 100 and the second outer skin layer 200. The sandwich type end plate 1000 according to the present invention may further include a second functional layer 600 stacked between two of the core layers 310. The second functional layer 600 may include at least one of a heat insulating material, a sound absorbing material, and a cushioning material so that the sandwich type end plate 1000 according to the present invention may additionally have a sound absorbing function, a vibration resisting function, and/or a heat transfer preventing function, thereby effectively protecting the battery module from external influences.

In addition, in the sandwich type end plate 1000 according to the second embodiment of the present invention, the first outer skin layer 100 and the second outer skin layer 200 may have accommodating portions 210 bent to protrude outward of the respective core layers 310, and the core layers 310 contacting the first outer skin layer 100 and the second outer skin layer 200 may protrude to correspond to the respective accommodating portions 210. In this case, the accommodating portion 210 formed in the first outer skin layer 100 may be formed to be flat at the highest protruding position so that most of the area of the accommodating portion 210 is in close contact with the battery cell.

As a result, the flat surface of the accommodating portion 210 of the first outer skin layer 100 tightly adheres to the battery cell to more closely support the shape of the battery cell, and each of the core layers 310 formed to protrude thick may have a larger stiffness against a bending load in the plane direction. Finally, it is possible to more effectively secure a high resistance to a swelling force.

Figure 6:
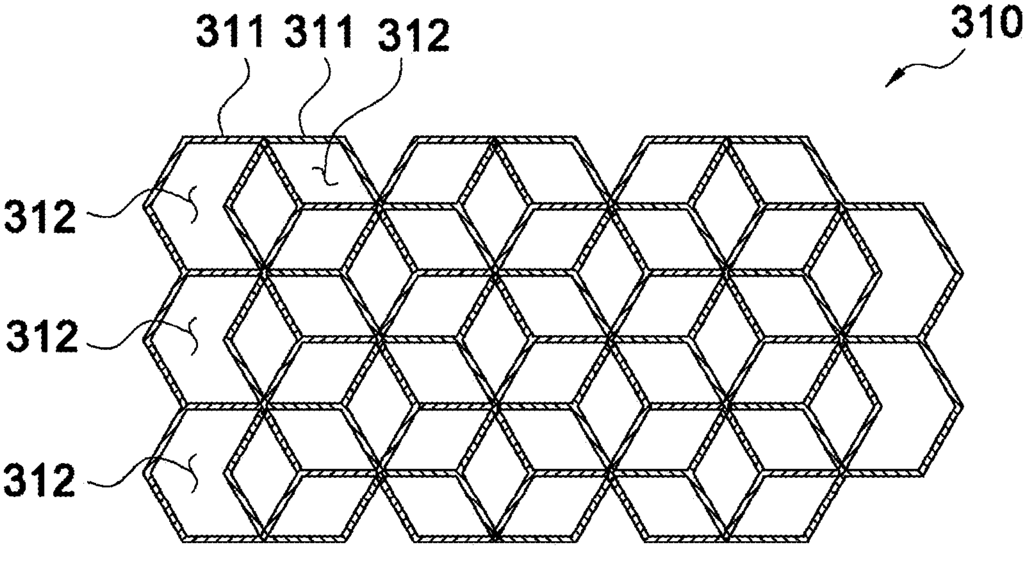
FIG. 6 is a longitudinal cross-sectional view illustrating a sandwich type end plate according to a specific example of the second embodiment of the present invention.

As illustrated in FIG. 6, the core layer 310 may be formed by repeating a barrier rib 311 having a predetermined shape and extending perpendicularly to the stacking direction. The core layer 310 may be a honeycomb core as described above. In this case, the two core layers 310 contacting both surfaces of the second functional layer 600, respectively, may be disposed so that the barrier ribs 311 of one of the two core layers 310 intersect the barrier ribs 311 of the other one of the two core layers 310. As a result, it is possible to maintain a higher stiffness against the force applied in the bending direction.

The technical idea should not be interpreted as being limited to the above-described embodiments of the present invention. The present invention is applicable in a variety of ranges, and may be modified in various manners by those skilled in the art without departing from the gist of the present invention claimed in the claims. Therefore, such improvements and modifications fall within the protection scope of the present invention as long as they are obvious to those skilled in the art.

What is claimed is:

1. A sandwich type end plate supporting at least one end of a battery module in which a plurality of battery cells are stacked, the sandwich type end plate comprising:

a first outer skin layer configured as a plate provided in a direction toward the plurality of battery cells;

a second outer skin layer configured as a plate provided in a direction opposite to the plurality of battery cells; and a core module including at least one core layer configured as a plate provided between the first outer skin layer and the second outer skin layer, wherein a core layer of the at least one core layer has a larger stiffness toward a direction in which the plurality of battery cells are stacked than the first outer skin layer and the second outer skin layer, and the at least one core layer protrudes toward the second outer skin layer, wherein the second outer skin layer is bent to protrude outward to form an accommodating portion, and one surface of the core layer contacting the second outer skin layer protrudes toward the second outer skin layer to fill the accommodating portion, and the other surface of the core layer is formed to be flat, the sandwich type end plate further comprises: a reinforcing block provided at a central portion of the accommodating portion and inserted through the core layer.

2. The sandwich type end plate of claim 1, wherein the core layer is made of a porous material including a plurality of core holes and barrier ribs forming boundaries between the core holes.

3. The sandwich type end plate of claim 1, wherein the accommodating portion is formed in such a manner that a cross-sectional area decreases as a protruding height increases, and the accommodating portion is formed to have the largest protruding height at a position corresponding to the center of one surface of each of the plurality of battery cells.

4. The sandwich type end plate of claim 1, wherein the reinforcing block includes one or more through holes formed in the direction in which the plurality of battery cells are stacked.

5. The sandwich type end plate of claim 1, further comprising: a first functional layer stacked between the first outer skin layer and the plurality of battery cells, wherein the first functional layer includes an insulating material.

6. The sandwich type end plate of claim 1, wherein the core module includes two or more core layers between the first outer skin layer and the second outer skin layer, and the sandwich type end plate further comprises a second functional layer inserted and stacked between two of the core layers.

7. The sandwich type end plate of claim 6, wherein the first outer skin layer and the second outer skin layer are bent to protrude outward of the respective core layers to form accommodating portions, and the core layers contacting the first outer skin layer and the second outer skin layer protrude to correspond to the respective accommodating portions.

8. The sandwich type end plate of claim 6, wherein the second functional layer includes at least one of a heat insulating material, a sound absorbing material, and a cushioning material.

9. A sandwich type end plate supporting at least one end of a battery module in which a plurality of battery cells are stacked, the sandwich type end plate comprising:

a first outer skin layer configured as a plate provided in a direction toward the plurality of battery cells;

a second outer skin layer configured as a plate provided in a direction opposite to the plurality of battery cells; and a core module including two or more core layers configured as a plate provided between the first outer skin layer and the second outer skin layer, wherein a core layer of the two or more core layers has a larger stiffness toward a direction in which the plurality of battery cells are stacked than the first outer skin layer and the second outer skin layer, and the two or more core layers protrude toward the second outer skin layer, wherein the core module includes two or more core layers stacked between the first outer skin layer and the second outer skin layer in the direction in which the plurality of battery cells are stacked and the sandwich type end plate further comprises a second functional layer inserted and stacked between two of the core layers in the direction in which the plurality of battery cells are stacked.

10. The sandwich type end plate of claim 9, wherein the core layer is made of a porous material including a plurality of core holes and barrier ribs forming boundaries between the core holes.

11. The sandwich type end plate of claim 9, wherein the second outer skin layer is bent to protrude outward to form an accommodating portion, and one surface of the core layer contacting the second outer skin layer protrudes toward the second outer skin layer to fill the accommodating portion, and the other surface of the core layer is formed to be flat.

12. The sandwich type end plate of claim 11, wherein the accommodating portion is formed in such a manner that a cross-sectional area decreases as a protruding height increases, and the accommodating portion is formed to have the largest protruding height at a position corresponding to the center of one surface of each of the plurality of battery cells.

13. The sandwich type end plate of claim 12, further comprising:

a reinforcing block provided at a central portion of the accommodating portion and inserted through the core layer.

14. The sandwich type end plate of claim 13, wherein the reinforcing block includes one or more through holes formed in the direction in which the plurality of battery cells are stacked.

15. The sandwich type end plate of claim 11, further comprising:

a first functional layer stacked between the first outer skin layer and the plurality of battery cells, wherein the first functional layer includes an insulating material.

16. The sandwich type end plate of claim 9, wherein the first outer skin layer and the second outer skin layer are bent to protrude outward of the respective core layers to form accommodating portions, and the core layers contacting the first outer skin layer and the second outer skin layer protrude to correspond to the respective accommodating portions.

17. The sandwich type end plate of claim 9, wherein the second functional layer includes at least one of a heat insulating material, a sound absorbing material, and a cushioning material.

* * * * *